United States Patent [19]

Pabsch et al.

[11] Patent Number: 5,135,596

[45] Date of Patent: Aug. 4, 1992

[54] PROCESS FOR MANUFACTURING FLANGED TUBULAR MEMBERS FROM FIBER COMPOSITES

[75] Inventors: Arno R. E. K. Pabsch, Braunschweig; Werner E. Strehlow, Wolfenbüttel, both of Fed. Rep. of Germany

[73] Assignee: Deutsche Forschungsanstalt fur Luft- und Raumfahrt e.V., Linder Hohe, Fed. Rep. of Germany

[21] Appl. No.: 659,756

[22] Filed: Feb. 22, 1991

[30] Foreign Application Priority Data

Feb. 23, 1990 [DE] Fed. Rep. of Germany ....... 4005771

[51] Int. Cl.$^5$ ............................................ B65H 81/00
[52] U.S. Cl. .................................... 156/156; 156/173; 156/194; 156/429; 264/314
[58] Field of Search ............... 156/173, 425, 428, 429, 156/156, 194, 169, 175, 430, 189, 285; 264/248, 313, 314, 257, 258; 249/152

[56] References Cited

U.S. PATENT DOCUMENTS

| | | | |
|---|---|---|---|
| 3,282,757 | 11/1966 | Brussee | 156/172 |
| 3,788,918 | 1/1974 | Poulsen | 156/173 |
| 3,970,495 | 7/1976 | Ashton et al. | 156/175 |
| 4,023,835 | 5/1977 | Ewing et al. | 156/173 |
| 4,062,717 | 12/1977 | McClean | 156/425 |
| 4,126,659 | 11/1978 | Blad | 264/317 |
| 4,169,749 | 10/1979 | Clark | 156/173 |
| 4,213,641 | 7/1980 | Bennett | 156/425 |
| 4,234,368 | 11/1980 | Schwarz | 156/49 |
| 4,348,247 | 9/1982 | Loyd et al. | 156/156 |
| 4,364,894 | 12/1982 | Mayumi et al. | 264/257 |
| 4,657,717 | 4/1987 | Cattanach et al. | 264/314 |
| 4,762,583 | 8/1988 | Kaempon | 156/173 |
| 4,927,642 | 5/1990 | Kunz | 264/314 |
| 5,071,506 | 12/1991 | Nelson et al. | 264/314 |

FOREIGN PATENT DOCUMENTS

| | | | |
|---|---|---|---|
| 0290798 | 11/1988 | European Pat. Off. | 156/173 |
| 2927955 | 1/1981 | Fed. Rep. of Germany . | |
| 2030036 | 10/1970 | France | 156/173 |

Primary Examiner—Jay H. Woo
Assistant Examiner—Robert B. Davis
Attorney, Agent, or Firm—Salter, Michaelson & Benson

[57] ABSTRACT

A process for manufacturing a fiber reinforced tubular member having flanges at opposite ends thereof includes the steps of applying a winding including a plurality of fiber strands in an uncured curable matrix to a core element having a pair of spaced outwardly extending spreader elements thereon so as to form a central winding portion and a pair of conical winding portions on the core element; applying a forming tool to the winding between the spreader elements, the forming tool having a tubular inner surface, opposite outwardly extending end faces and transition edges therebetween; applying resilient outward pressure to the winding so as to urge the winding against the forming tool along the transition edges; uniformly applying the fiber from the conical portions of the winding to the end faces of the forming too; and curing the matrix.

10 Claims, 12 Drawing Sheets

PROCESS FOR MANUFACTURING FLANGED TUBULAR MEMBERS FROM FIBER COMPOSITES

BACKGROUND OF THE INVENTION

The invention relates to a process for manufacturing structural members made of fibre composites, which have at least one plane flange adjoining a tubular region, for example to be used for a flexible coupling.

A process of the type described is known for manufacturing coupling elements having a bellows-like compensating element (DE-PS 29 27 955). The compensating element has two flanged disks which are connected at their outer peripheries by the fibre composite. Positioned on a part of a winding spindle is a core corresponding in shape and dimensions to the central part and, adjoining this, a displaceable sleeve. The winding is wound around the core conically on both sides. On completion of the winding, the winding and/or the laminate together with the sleeve and the core are compressed in an axial direction by means of a pressing tool and hardened. With this process, it is impossible to achieve ordered spreading of the fibres out of the winding cone into the plane of the flanges, without which an adequate service life is unattainable.

The aim of the invention is a process and suitable devices for effecting said process, by means of which it is possible to manufacture compensating elements in which an ordered flow of fibres in the flange region is ensured.

SUMMARY OF THE INVENTION

The invention accordingly proposes a process for manufacturing structural members made of fibre composites, said members having a tubular region and a planar flange at either end of said region, said process comprising the following steps: on a winding core determining the inner contour of the tubular region, applying a winding comprising fibre strands which cross one another at an angle to the axis of the core; at the ends of the tubular region causing conical widening of the tubular region by applying the strands over spreader elements lying at a distance from the core; on completion of the winding, placing onto the tubular region of the winding a form tool which embraces the tubular region and is provided at both ends with a face determining the inside of said plane flanges, said form tool having a rounded edge between the tubular region and said face; and applying pressure by an elastic medium to the conical regions of the winding, prior to being applied onto the faces of the mold, in the region of the rounded edges to cause the winding to lie adjacent to the faces of the form tool.

BRIEF DESCRIPTION OF THE DRAWINGS

The invention is illustrated by way of example in the drawings and is described hereinafter in detail with reference to the drawings. The drawings show.

DESCRIPTION OF THE PREFERRED EMBODIMENTS

The devices shown in the drawings are devices for manufacturing flexible couplings made of fibre composites. The fibres involved may be glass fibres, carbon fibres or other fibres of the type usually used to manufacture fibre composites and the matrix may comprise a synthetic resin or alternatively a thermoplastic. The choice of material depends on the demands placed upon the structural member. In terms of the manufacturing process, the type of fibre and material for the matrix is of secondary importance. For this reason, no detailed description of these is given. The following is a description of the process using a synthetic resin.

Figure 1:
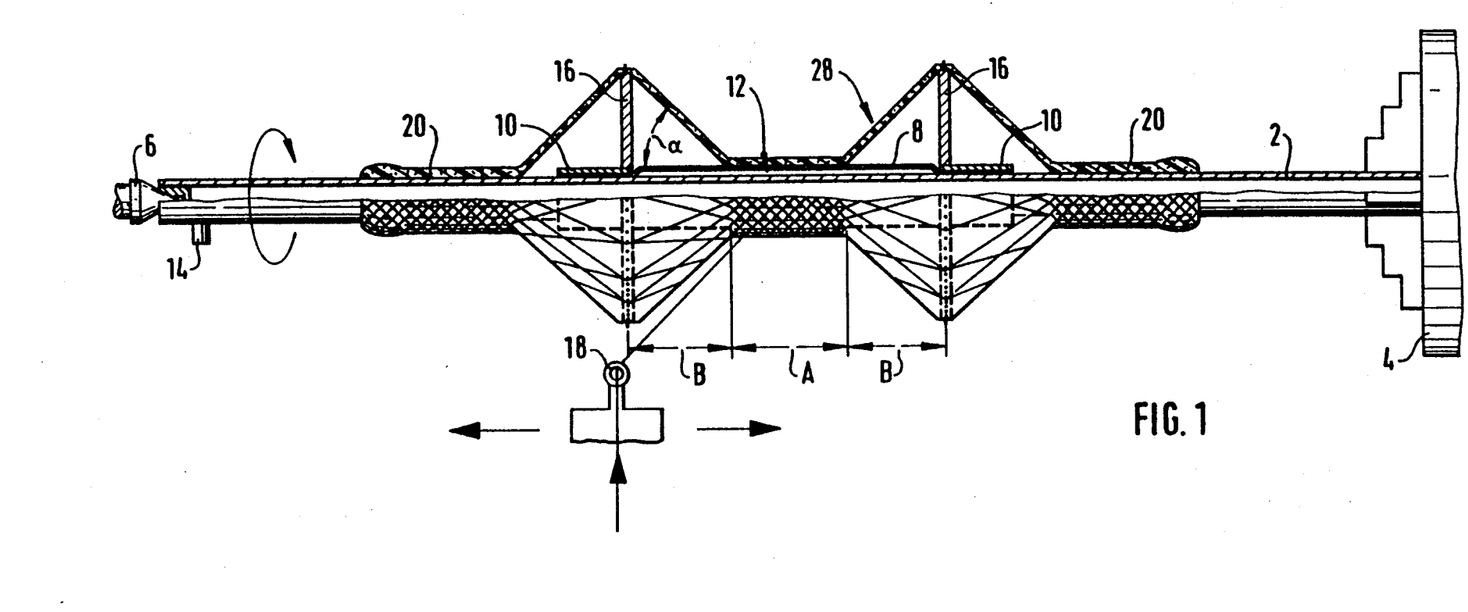
FIG. 1 a diagrammatical view of a first embodiment of a device for manufacturing flexible couplings.

The tool shown in FIG. 1 has a core carrier 2 which is rotatably supported, as is shown here by a diagrammatically illustrated clamping chuck 4 into which the core carrier 2 is clamped. The opposite end of the core carrier 2 is supported in a revolving tip 6. The winding core is formed by a rubber tube 8 which is held at either end sealingly against the core carrier 2 by annular fastening elements 10. The interlying region of the rubber tube 8 is supported by means of an air-carrying intermediate layer 12 on the core tube. In said region, a connection bore is provided in the tubular core carrier 2. The tubular core carrier 2 is closed at both ends and is provided at one end with a connection 14 by means of which the core carrier 2 is connectible on the one hand to a vacuum source and on the other hand to a compressed-air source. Detachably fastened on the fastening elements 10 are spreader disks 16 which may be provided externally with positioning pins. The device is further provided with a thread guide, here diagrammatically represented by a thread eyelet 18. For winding, the core carrier 2 is placed under a vacuum so that the rubber, the core carrier 2 is placed over the intermediate layer 12 on the core carrier 2.

In the embodiment, the winding to be produced comprises a substantially cylindrical portion A and two tapered or conical portions B which adjoin both ends of the cylindrical portion A. The portion may alternatively be tapered on one or two sides with a slight taper. The spreader disks 16 are disposed at such a distance from the ends of the cylindrical portion A that the fibre strands pass over from the winding in the cylindrical region A into the conical region in an optimum manner. In the embodiment of FIG. 1, the winding is wound starting from two cylindrical winding overhangs 20 at the outer sides of the spreader disks 16, with a conical ascent of the fibre strands towards the periphery of the spreader disks 16 also being effected at the outer side. The fibre strands are wound impregnated with the synthetic resin.

On completion of the winding, which may be—and preferably is —multi-layered, a form tool 21 is placed onto the winding element. Said form tool has a width b corresponding to the width of the cylindrical portion A. The form tool 21, here of a two-piece construction having the two mold halves 22, 24, in its assembled state has a cylindrical opening 26 which corresponds to the desired outer diameter of the cylindrical portion A of the structural member to be manufactured and here takes the form of two half-shells in each of the two parts 22 and 24 of the form tool 21.

Figure 2:
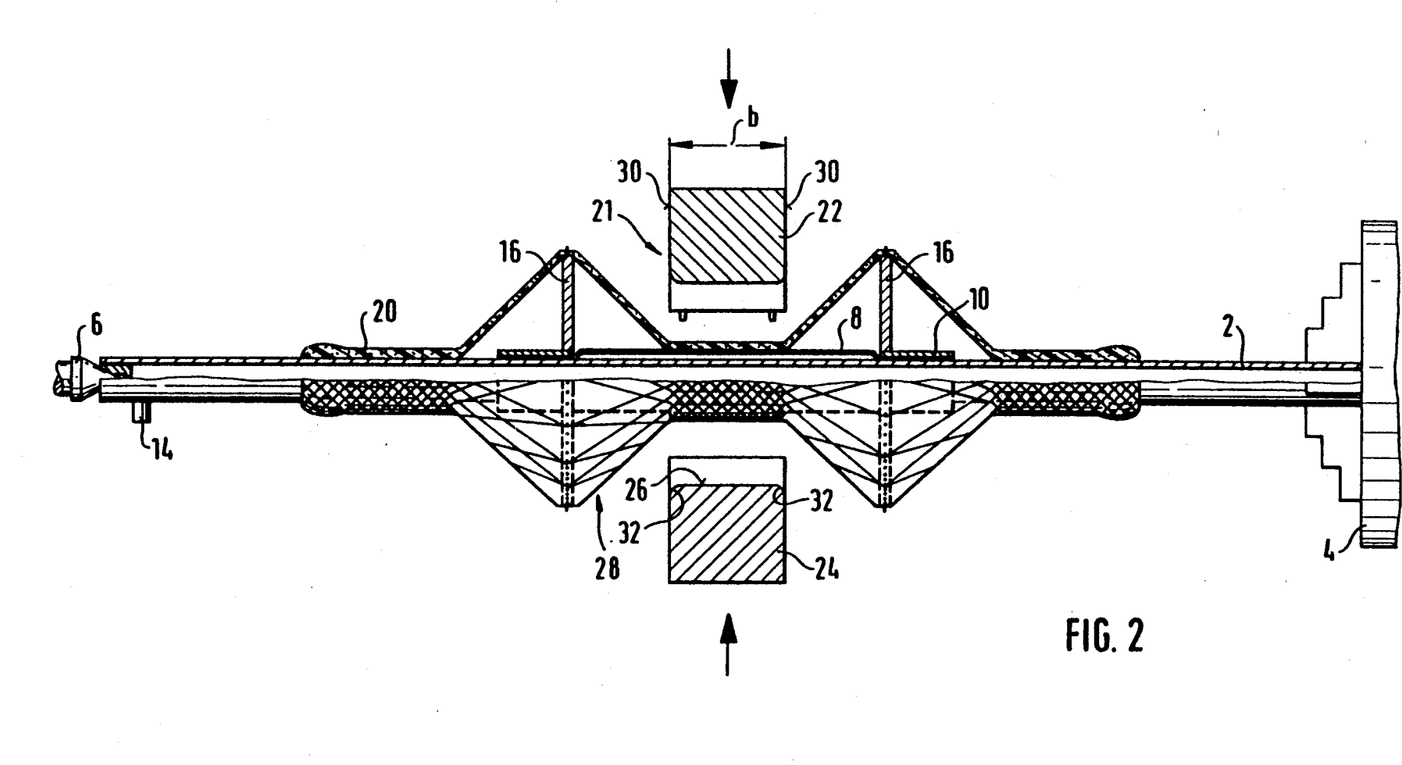
FIGS. 2 to 9 the device in various steps of the manufacturing process, with FIG. 9 reproducing a cut-out portion of FIG. 8 to an enlarged scale.
Figure 3:
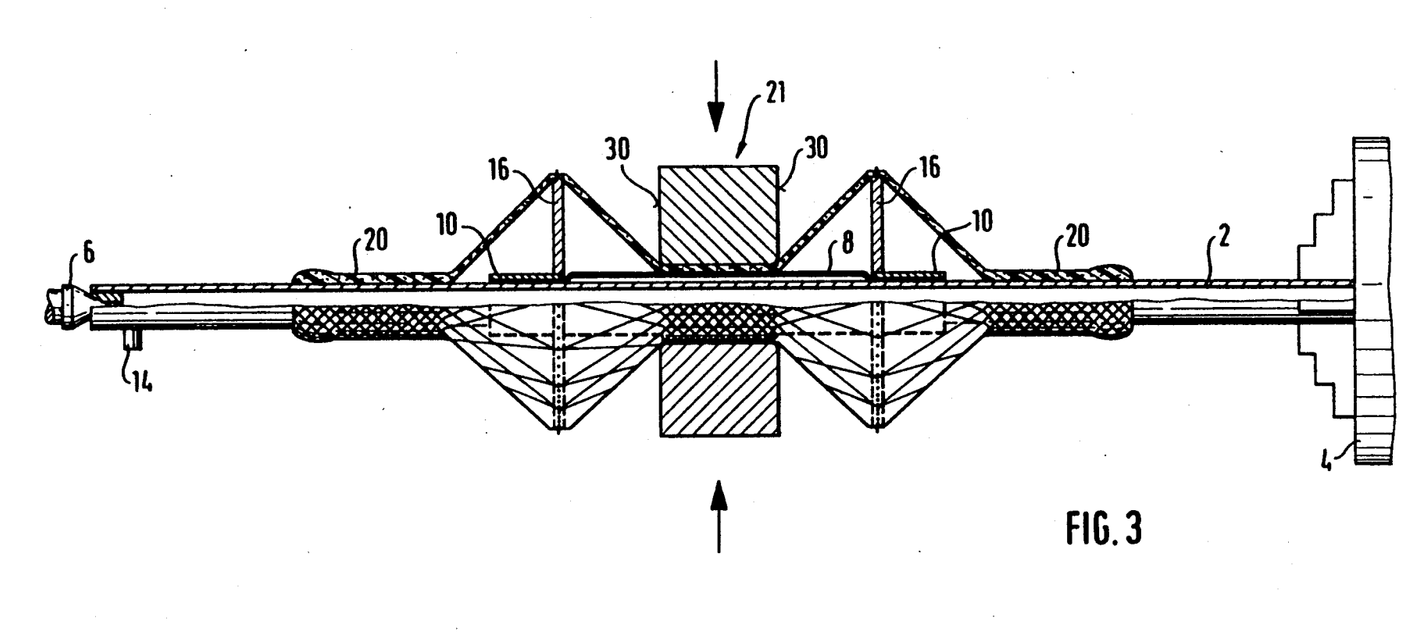

Surfaces 30 disposed at right angles to the axis of the opening 26 on both ends of the form tool 21 define forming surfaces for the flanges of the structural member to be formed from the winding element 28 of FIG. 1 or FIG. 2. Transition radii 32 are formed on the ends of the opening 26 at the transition to the surfaces 30.

Figure 4:
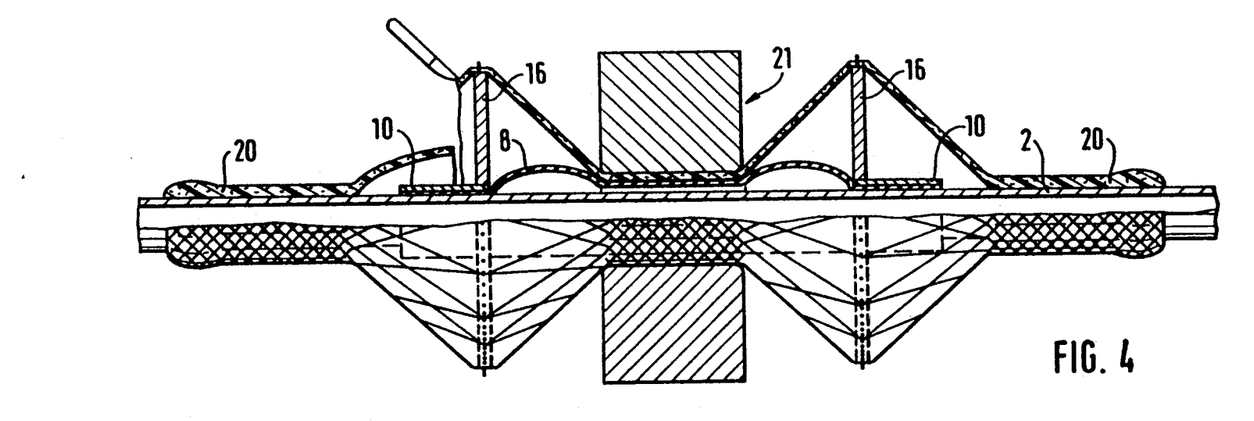
Figure 5:
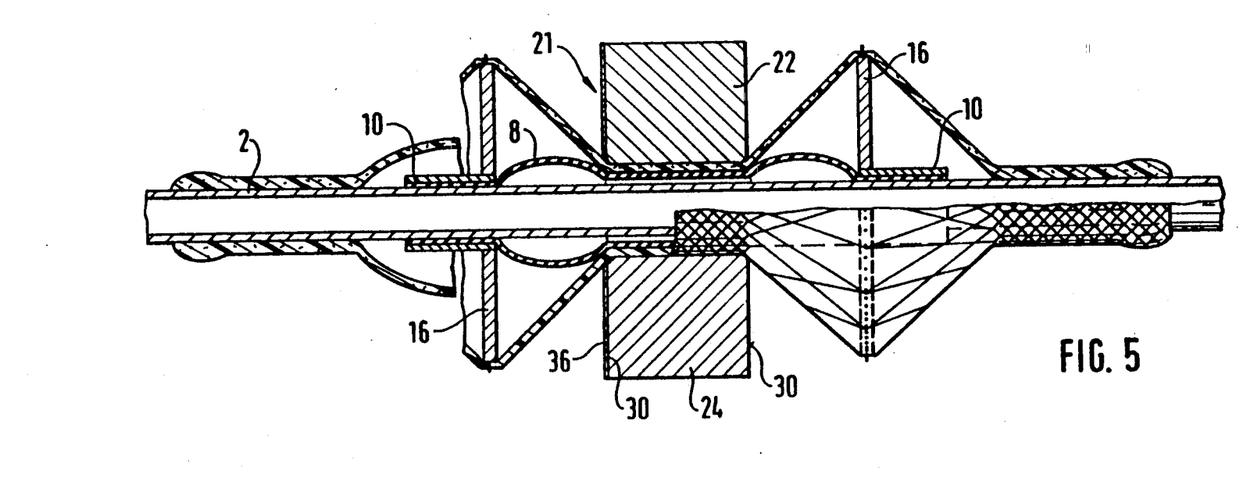
Figure 6:
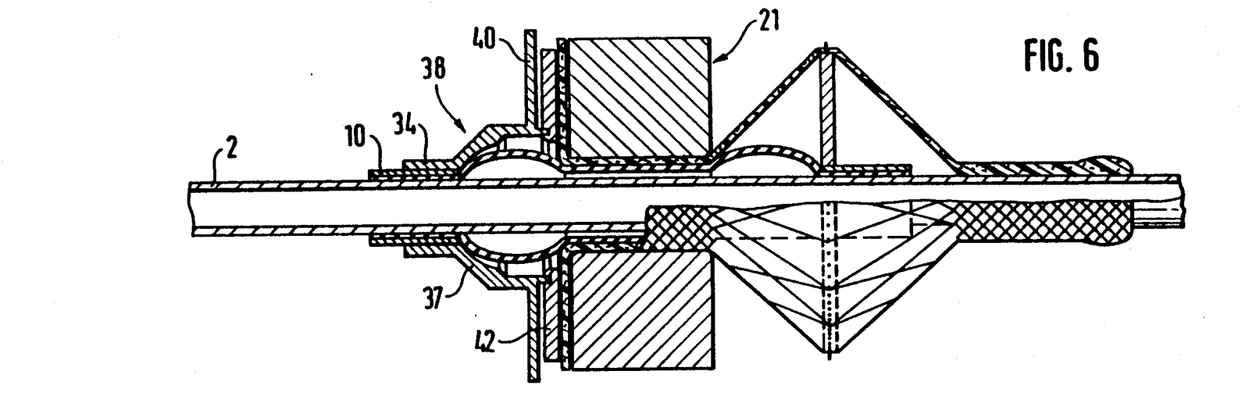

After closure of the form tool 21, compressed air is admitted into the core carrier 2 until the rubber tube 8 slightly expands in the region of the conical widening of the winding, as is shown in FIG. 5. During this process, the fibre strands in the region of the transition radius 32 are pressed and held against the form tool. At the same time, there is a first displacement of excess resin from the winding in the region of the transitions. The winding is therefore simultaneously fixed relative to the form tool 21. It is then possible, first at one end, to separate the conical portion of the winding outside of the spreader disk 16, as is indicated in FIG. 4. The winding is then applied, with simultaneous widening of the cone, against the adjacent face 30 of the form tool 21. Prior to this, a fibre layer 36 in the form of a fibrous tissue, which is used to increase the shear strength of the flange to be formed, may be placed on said face 30.

Figure 9:
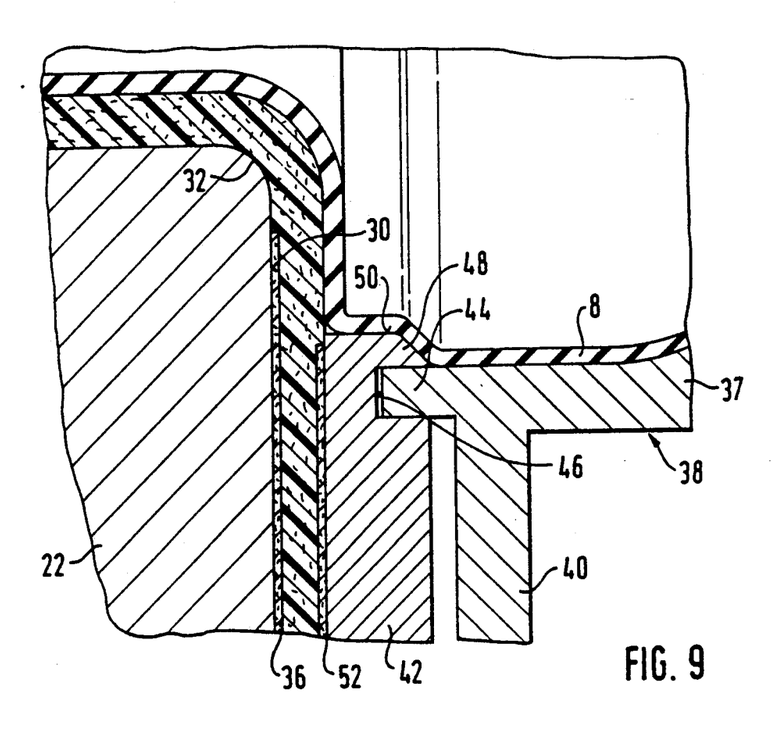

After the winding, which has been opened out to form a flange disk, has been applied against the face 30, the spreader disk 16 is removed and a support tool 38 is placed onto the cylindrical fastening element 10 for the rubber tube 8. Said support tool is guided on the fastening element by means of a cylindrical portion 34. The support tool has a bell-shaped portion 37, adjoining which is a flange 40. Located below this is a further flange 42 which here takes the form of a separate structural member with an annular groove 46. Engaging into said groove 46 is an annular projection 44 on the support tool, by means of which the flange 42 is guided in an axially displaceable manner radially to the support tool 38, as is shown in detail in FIG. 9. The flange 42 has an inner diameter, which is greater than the diameter of the opening of the form tool 21 measured over the transition radii, and is provided on its side facing the form tool with a preferably cylindrical bore 50.

Widening of the conical portions of the winding leads to thinning of the fibre layer and hence to a reduction in the thickness of the fibre layer. The radial front faces of the form tool and the flanges 42 should therefore be constructed with a corresponding amount of taper. Moreover, in the region of the connection boring to be provided in the edge region of the flange, recesses capable of absorbing the bearing pressures of the ports should be provided in order to increase the flange thickness in the region of the belt of ports. If necessary, additional annular fabric layers may also be provided here by way of reinforcement.

Figure 7:
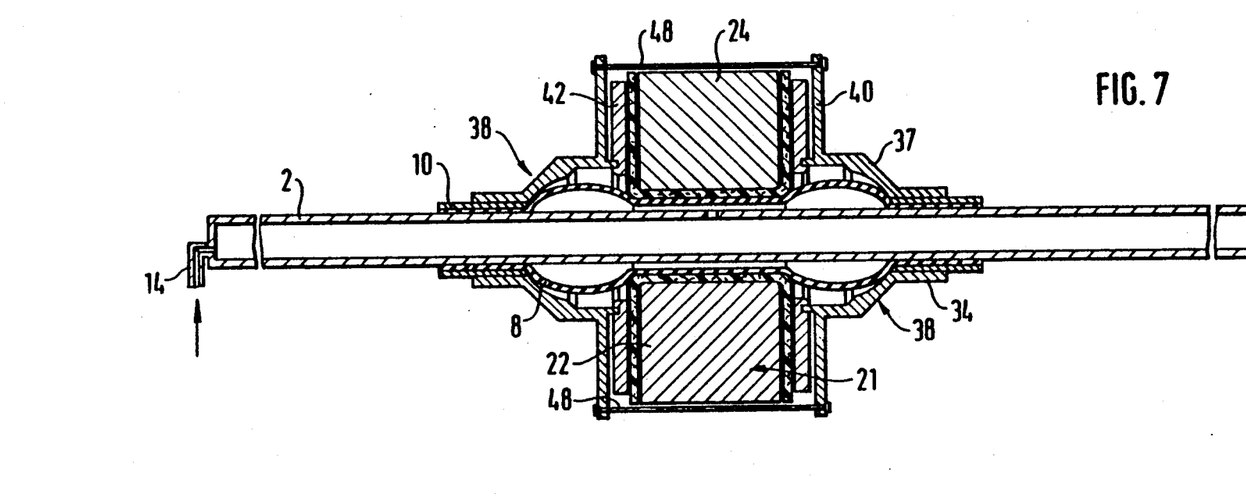

After the support tool 21 has been fitted on one end, a further support tool 21 is placed on the other end. The two support tools 21 are then braced towards one another by means of clamping bolts 49, as shown in FIG. 7. The clamping bolts 49 act upon the flanges 42 of the support tools.

After bracing of the support tools, the air pressure inside the rubber tube 8 is increased, causing the latter to expand until the bell-shaped part of the support tool is completely filled. In so doing, progressive pressure is exerted by way of the rubber tube upon the winding in the region of the transition radius 32 and radially beyond. Since the rubber tube, starting from the situation of FIG. 5, then rolls off in a radially outward direction over the winding in the transition radius, the winding in this region is progressively placed under pressure by the rubber tube. Excess synthetic resin and any trapped air are therefore displaced radially outwards. As a result of the movability of the flange 42, which is pressure-loaded by way of its inclined shoulder 48 in an axial direction by the rubber tube 8, pressure is also generated in the region of the flange of the workpiece and is the means whereby excess resin and any trapped air are expelled.

Figure 8:
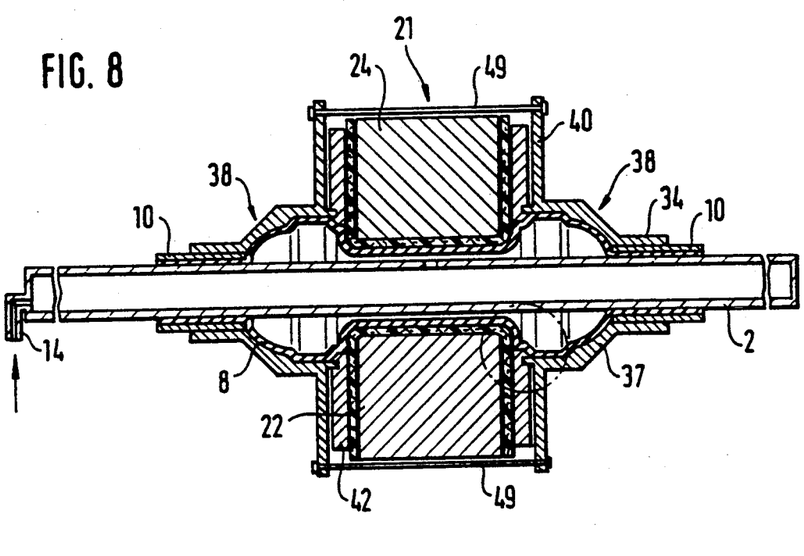

The fibre layer 36 mentioned above is clearly visible in FIG. 9. Here, a further fibre layer 52 is disposed on the outside of the flange. After the widened widing cone has been applied against the forming surfaces 30, said further fibrous layer is placed onto the winding before the support tool is applied. A check valve is provided for the compressed-air inlet 14 so that, during subsequent hardening of the workpiece, the excess pressure in the rubber tube 8, which brings about the above-mentioned contact pressing, is maintained. The tool may then be placed, in the form shown in FIG. 8, into a furnace to harden the synthetic resin. The contour of the workpiece is clearly visible in FIG. 8.

After hardening and removal from the tool, the outer peripheries of the two flanges are trimmed and provided with the requisite connection bores.

Figure 10:
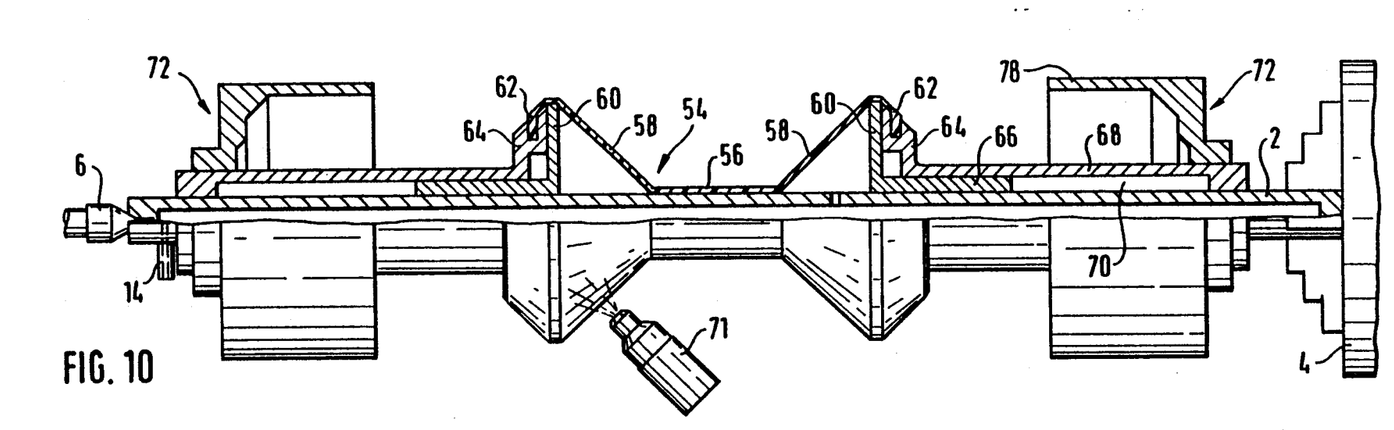
FIG. 10 a second embodiment of a device for manufacturing flexible couplings.

In the embodiment of FIG. 10, a tubular core carrier 2 is again provided which, in the manner described with reference to FIG. 1, is rotatable and is provided with a compressed-air outlet 14. The winding core 54 disposed on the core carrier 2 is again made of an elastomer. It takes the form of a thin-walled rotational solid having a cylindrical portion 56 adjoined by conical portions 58, which are conveyed over a spreader disk 60 and are suspended behind said spreader disk 60 by a beaded edge 62 in a flange-like holding device 64. The spreader disk 60 is support by a cylindrical shoulder 66 on the core carrier 2 and is preferably axially displaceable. The cylindrical shoulder 66 is supported between the outer periphery of the core carrier 2 and an axial shoulder 68 of the holding device 64. The interspace 70 is closed at either end and defines an annular cylinder chamber which is provided with a separate compressed-air connection (not shown). In this embodiment, bell-shaped support tools 72 are further supported in an axially displaceable manner at either end on the cylindrical shoulders 66 and, as is described below, cooperate with the form tool.

Figure 11:
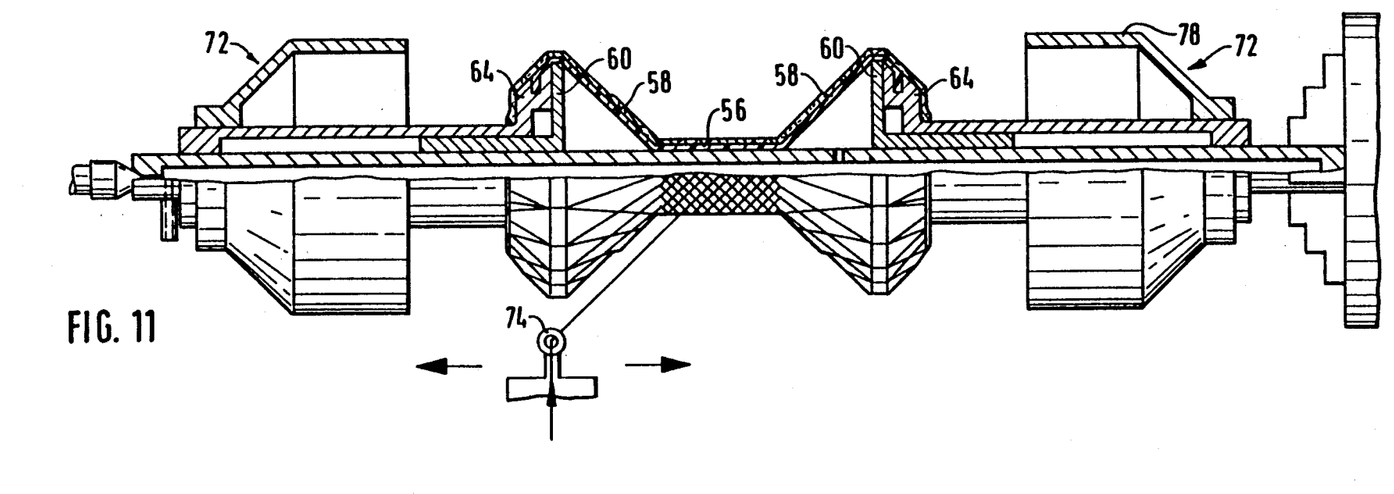
FIGS. 11 to 15 various stages of the manufacturing process.

To manufacture a structural member with flanges formed on both ends, a layer of fibres, which is used to increase the shear strength of the finished flange and therefore fulfils the same function as the fibre layer 52 in the first embodiment, is applied onto the surface of the conical portion 58 with the aid of a conventional fibre spray-coating device 71. Onto the winding core thus prepared, the winding is then applied, as is shown diagrammatically in FIG. 11, in the same manner as in the first embodiment and is conveyed here up to behind the holding device 64. The strand of fibres is again laid by means of a winding device with a thread guide, again indicated here by the thread eyelet 74.

Figure 12:
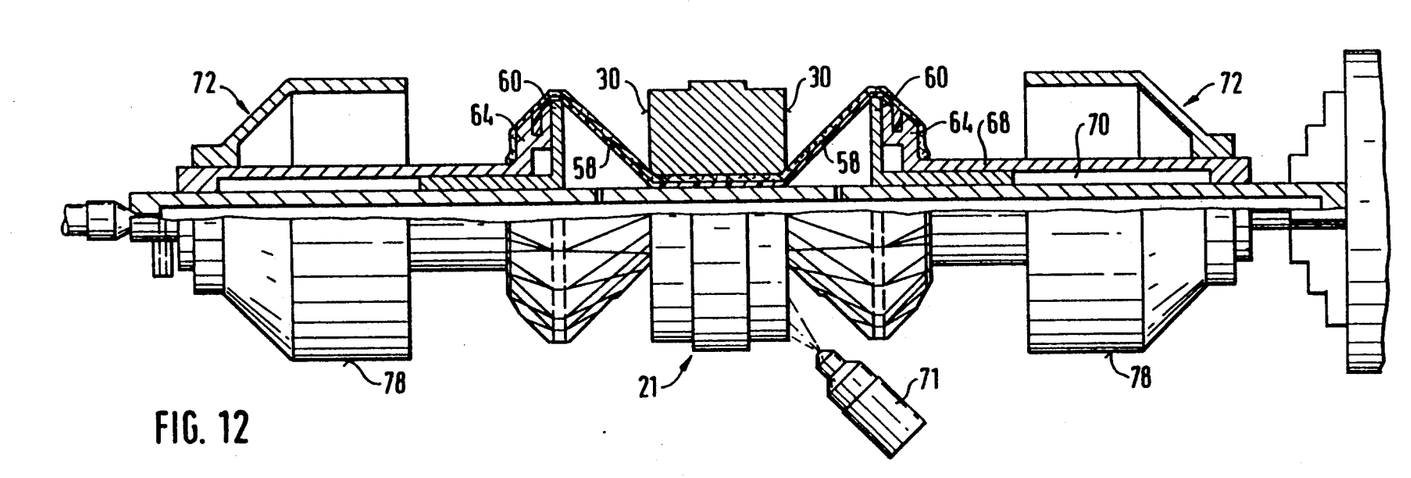
Figure 13:
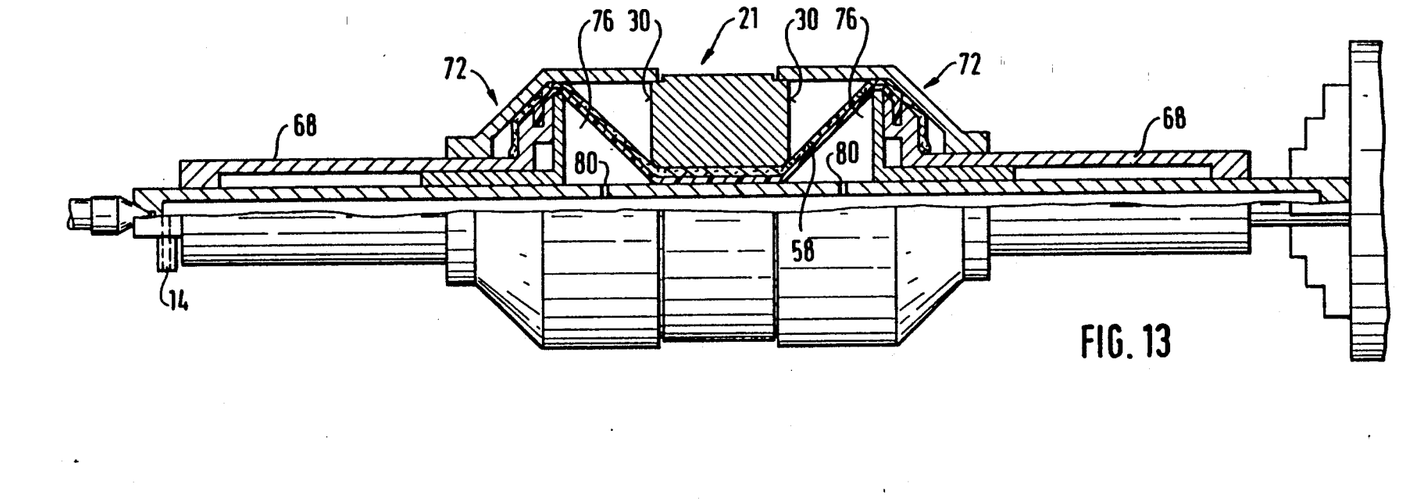

On completion of the winding, the form tool 21 is closed over the cylindrical portion of the winding, as is shown in FIG. 12. The form tool 21 is of a similar construction to that described above with reference to FIG. 2. A further layer of fibres is then applied by the fibre spray-coating device 71 onto both faces 30 of the form tool 21 and forms a reinforcing layer on the inside of the flanges of the workpiece similar to the reinforcing layer 36 described above with reference to FIG. 9.

The two bell-shaped support elements, which are shown in a slightly modified form in FIGS. 11 to 15, are then pushed with their bell-shaped casing 78 over the conical portion of the winding element, with the casing ends overlapping the form tool 21. The inner diameter of the bell-shaped portion 78 substantially corresponds to the diameter of the winding element over the spreader disk 60. Compressed air is then admitted into the winding core carrier 2 and through bores 80 enters the chamber 76 between the spreader disk 60 and the conical portions 58 of the winding core carrier 2. The compressed air deforms the elastic, thin-walled cone 58 with the conical winding portion lying thereon and presses it against the front forming surfaces 30 of the form tool 21. A continuous pressing action is effected, starting with the portion at the transition radii at both ends of the opening of the form tool and then continuing as far as the outer periphery of the forming surfaces 30. In this manner, there is progressive expulsion of excess resin and any trapped air from the opening in the form tool outwards.

As a result of the spreader disks 60 being axially displaceable, said disks may through the admission of compressed air into the annular cylinder chamber 70 be displaced towards the form tool 21 until they come to rest against the outside of the flanges and here effect post-compression of the flange surfaces. Under certain circumstances, however, it is also possible to dispense with axial displaceability of the spreader disks. The spreader disks may then form a single component with the holding device 64. The arrangement shown in FIGS. 14 and 15 is then placed in a furnace in which hardening of the synthetic resin is effected.

Figure 14:
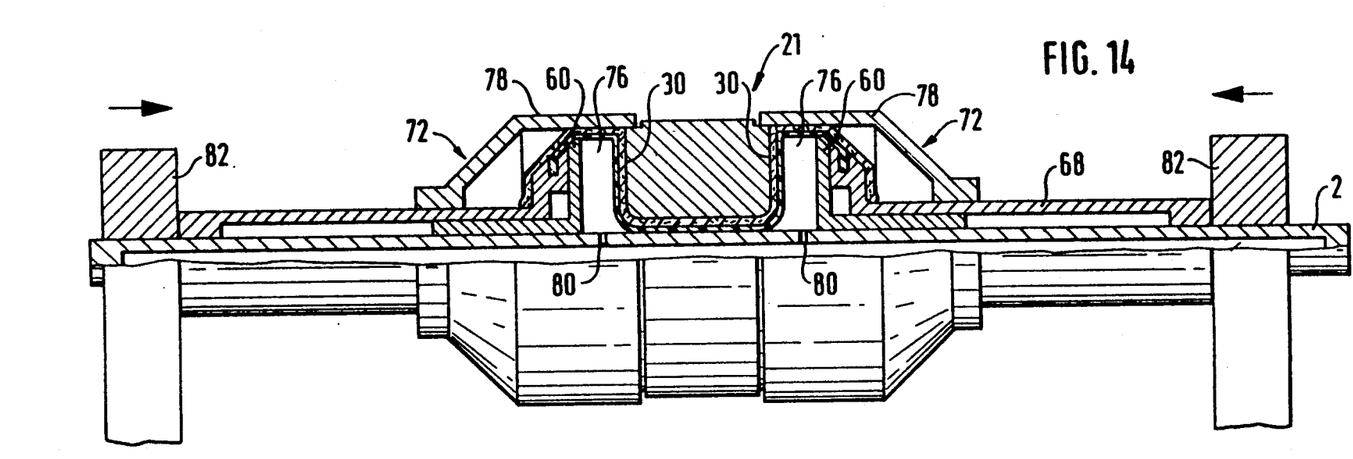
Figure 15:
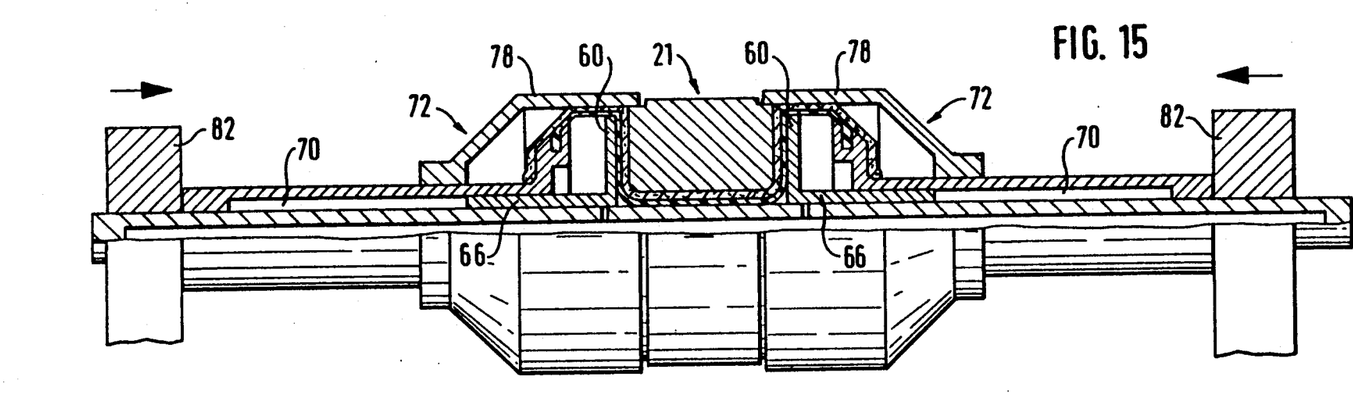

On completion of the winding, the tool may be removed from the winding machine and suspended in a separate carrying device, as shown in FIGS. 14 and 15, for the further processing stages which are illustrated in FIGS. 12 and 15. Said carrying device has two abutments 82, against which the cylindrical top 68 of the holding device 64 is supported and by which the power of reaction on introduction of the compressed air into the chamber 76 is absorbed, as well as the power of reaction on displacement of the support plate 80 as a result of the introduction of compressed air into the annular cylinder chamber 70. The two abutments 82 may simultaneously be supports of a carrier by means of which the tool with the workpiece is introduced into the furnace.

Figure 16:
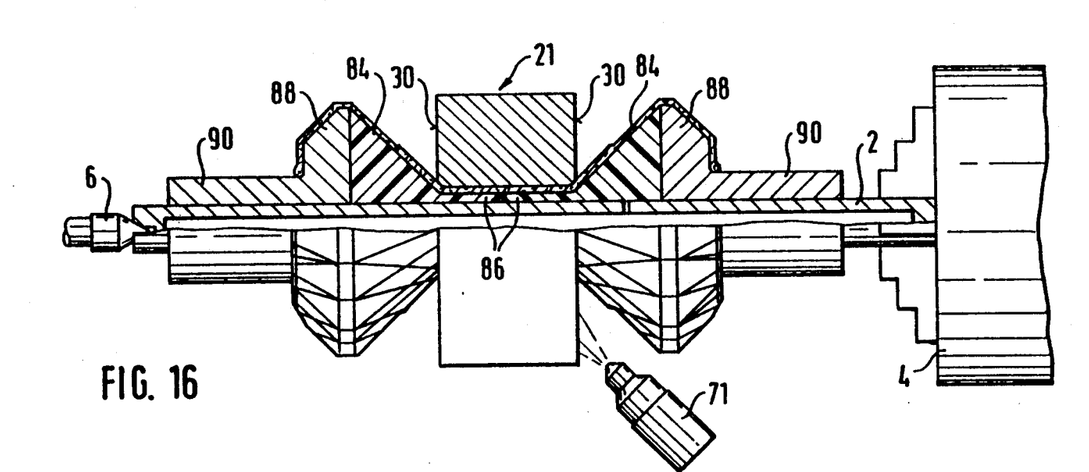
FIG. 16 a third embodiment of a device for manufacturing flexible couplings.

In the third embodiment shown in FIG. 16, the winding core mounted on the core carrier 2 comprises two conical portions 84 with adjoining cylindrical portions 86 which here abut one another in the middle of the cylindrical portion. The conical portions 84 are adjacent to flanges 88 which, at their outer peripheries, perform the function of the spreader disks. Here too, the winding is wound over the peripheries of the flanges 88. The flanges 88 are supported by means of cylindrical portions 90 in an axially displaceable manner on the core carrier 2. A cylinder chamber may again be provided for axial displacement. Alternatively, an external pressing device may be provided, into which the tool is inserted with the core carrier 2 on completion of the winding.

The winding is applied in the same manner as is described above in particular with reference to the embodiment of FIGS. 10 to 15. After application of the fibre layer on the front surfaces 30 of the form tool 21, which is shown as a process stage in FIG. 16, the form tool is used. The flanges with the cylindrical shoulders 90 are then moved towards the front forming surfaces 30 of the form tool 21. During said process, the conical portions 84 of the winding core are deformed until, in the final stage of said deformation, the conical winding portions have undergone suitable radial widening and lie adjacent to the axial forming surfaces 30 of the form tool 21. Simultaneously with deformation of the elastic cones 84, there is progressive compression of the winding from the inner peripheries of the flanges towards the outer peripheries, as a result of which again excess resin is expressed and any air is expelled. By means of the elastic cones, a uniform pressing against the tool is effected and the winding is compressed in the flange region.

Figure 17:
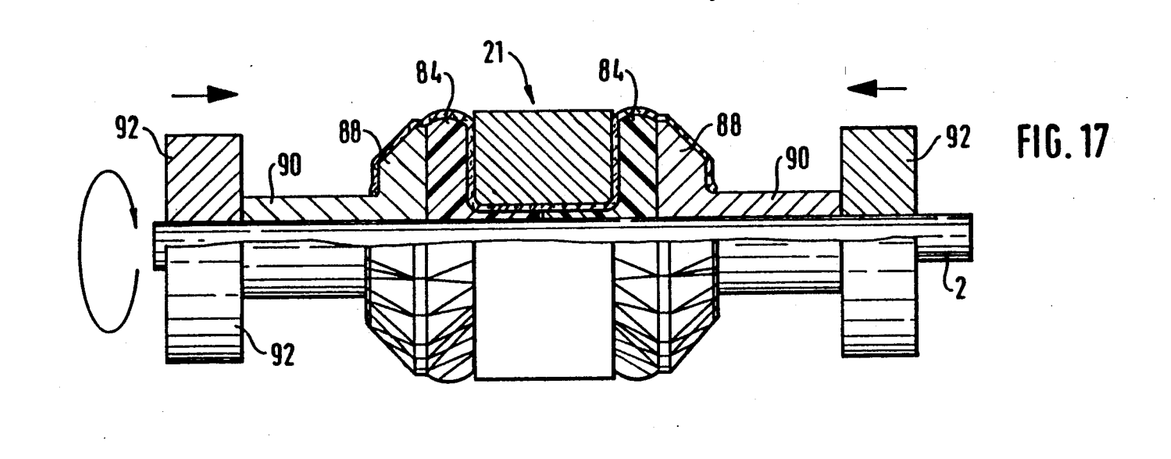
FIG. 17 the device of FIG. 16 in the closing stage of the process.

The mould of FIGS. 16 and 17 is an open mould. To prevent the synthetic resin from running out, the tool with the winding element has to be rotated about the axis of the core carrier 2 during axial pressing. There must also be continuing rotation subsequently during hardening. For this purpose, it is possible to place and lock on the ends of the winding carrier 2 rolling wheels 92 by means of which the tool may be conveyed on a roller conveyor through a heating furnace.

The tool in the embodiment of FIGS. 16 and 17 is remarkable for the simplicity of its construction and is particularly suitable for series production.

The axial distance between the flange disks of the workpiece, i.e. the axial length of the cylindrical portions, may vary according to requirements. For greater axial lengths, a separate tubular winding portion, which is likewise preferably made of an elastomer, may be provided between the ends of the cylindrical shoulders 86 of the elastomer cones 84.

In the embodiment of FIGS. 16 and 17, it is also possible to provide a plurality of winding cores axially one behind the other on the core carrier. For middle winding cores, winding core portions which are conical at both ends may lie with their base adjacent to a flange of low thickness, while the outer-lying flanges may be constructed in the manner illustrated. With such a multiple winding core, the windings for all the workpieces may be applied in a single pass. The deformation shown in FIG. 17 may be carried out by a pressing process. An added advantage is a reduction in the waste which occurs.

Workpieces, which are shown in the described manner with two flanges, may also be separated in the middle of the cylindrical portion and may then be glued as a connection flange to a connection pipe of appropriate length.

Workpieces manufactured in the described manner are distinguished by a defined flow of fibres in the flange region and also by the fact that the transition from the cylindrical portion to the flange is possible without thickening out. The workpieces are extremely resistant to reversed bending stresses of the type which occur especially in flexible couplings and may also be used particularly for shafts with cardan joints.

Figure 18:
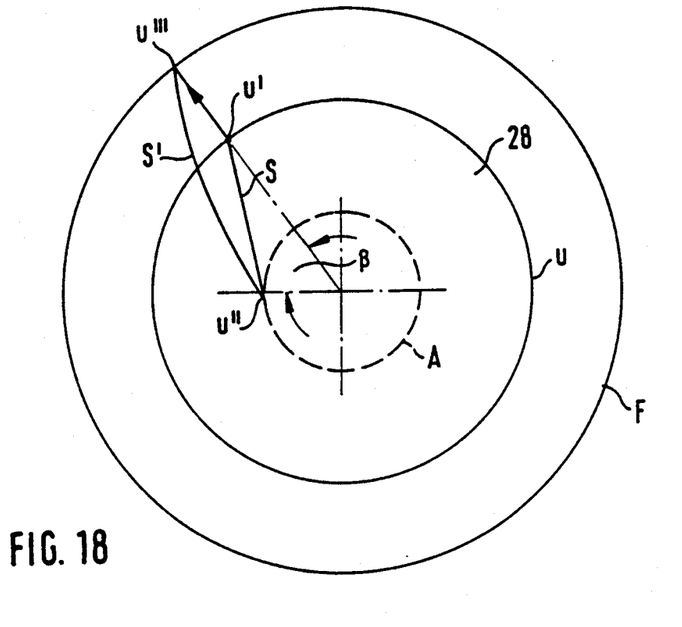
FIG. 18 a view of the conical portion of the winding core, viewed from the tip of the cone.

The flow of fibres during winding and their dislocation upon widening of the wound cone is diagrammatically illustrated in FIG. 18.

The end of the cylindrical portion A is shown by broken lines in FIG. 18. Said end is simultaneously the tip of the wound cone 28, i.e. of the conical winding portion which over the spreader disks 16 has its greatest diameter, represented here by the peripheral line U.

During winding, the fibres or the strand of fibres S is conveyed from the cylindrical portion A of the winding tangentially into the conical portion of the winding, and is conveyed at an angle of lead $\beta$ in the projection of $\approx 5°$ to the radius. The fibre therefore reaches the cone periphery U at the cone foot at the point u'. The fibre runs in a straight line between the foot point u'' and the point u' on the periphery U of the cone. The coupling flange F is shown by its periphery. Upon widening of the conical portion of the winding and depositing of the winding in the flange plane, the fibre end u' moves radially to the point u''' on the periphery of the flange. The fibre strand is deposited in the form of an arc S'.

Figure 19:
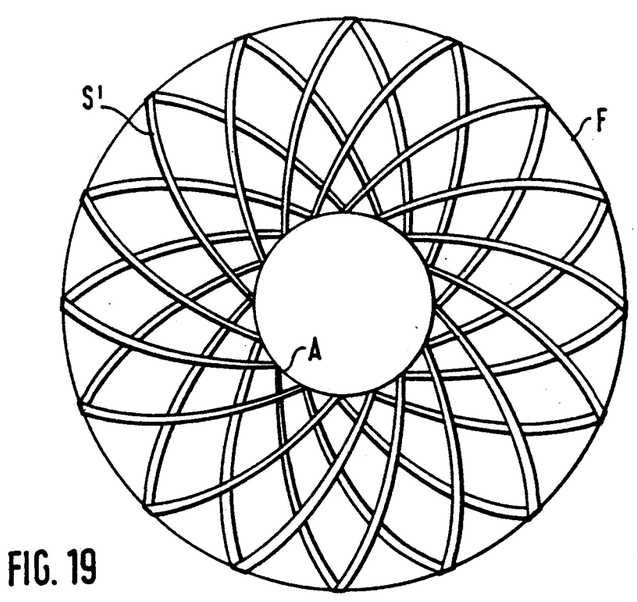
FIG. 19 the flow of the fibre strands in the finished flange.

The flow of fibres is shown in FIG. 19 once more for the entire flange surface. As FIG. 19 reveals, widening of the conical portion of the winding leads to a thinning out of the fibre content towards the outer periphery of the flange F. Said thinning out is a desired effect since it is the means whereby the flange thickness may be continuously reduced over the radius without involving any reduction in the transmissible shearing stresses. As a result, in the outer flange region so important to the compensating effect of the described structural member, there is reduced resilience and hence a reduced heat build-up, the latter being dependent upon the resilience. Moreover, the moment characteristic decreases towards the outside, resulting in a uniform stress over the flange surface.

Figure 20:
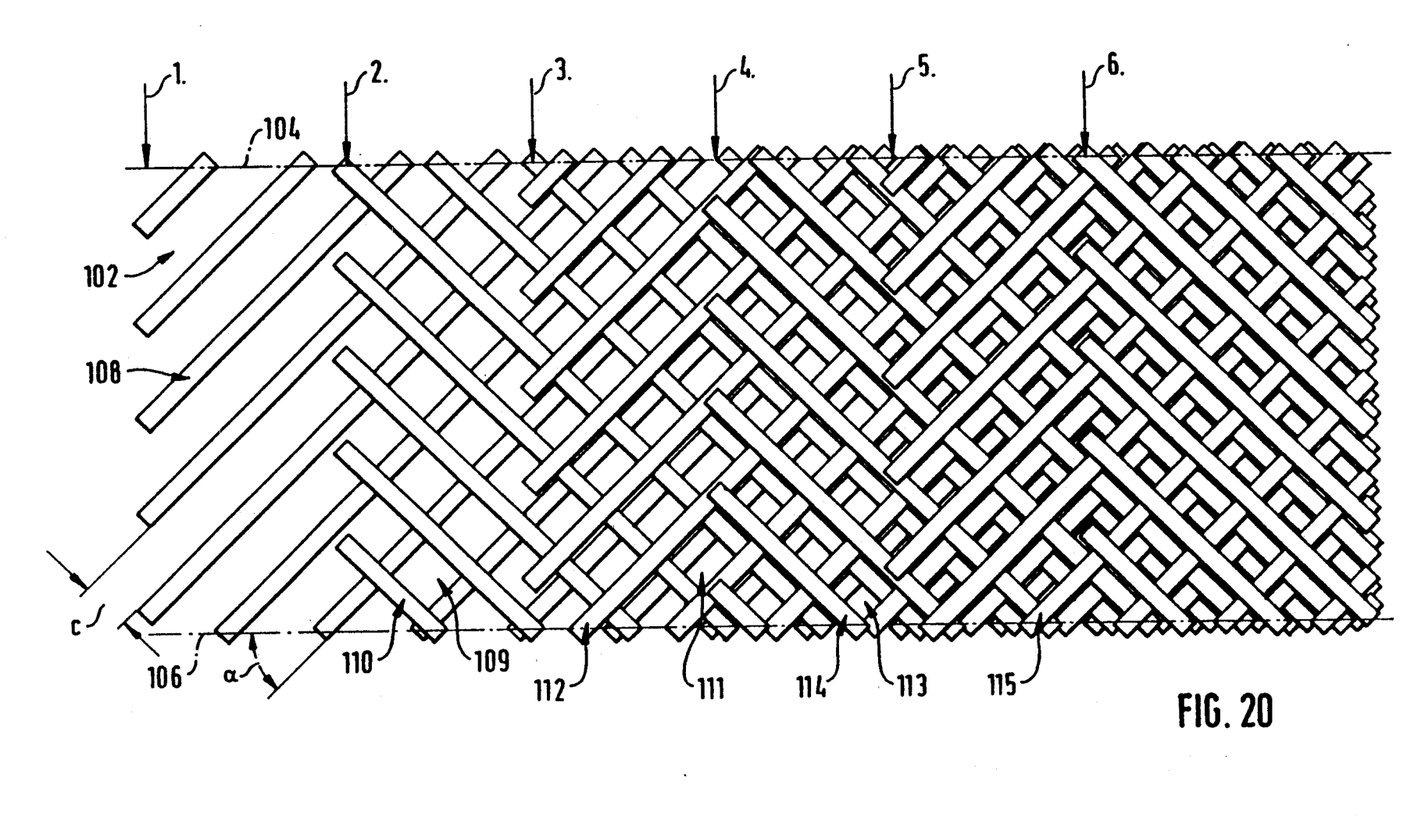
FIG. 20 a special winding technique which may be used for manufacture.

An advantageous form of a multi-layered winding is shown in FIG. 20. It is represented here in the form of the cylindrical portion A of the shaped element whose generated surface, for greater clarity, is reproduced in a plane view. Said generated surface 102 is reproduced here with its two edge lines 104 and 106, corresponding to a paraxial intersection line, as a boundary.

In the wound structure shown in FIG. 20, six windings, which are each alternately wound at an angle $\alpha$ to the axis, are applied on the winding core. The angle $\alpha$ is between 15° and 60° and, for optimum transmission of torsional forces, is 45°. The angle may moreover, as stated above, be reduced to as low as 15° if a high flexural strength is required.

The individual windings comprise a plurality of parallel-running fibre strands. A ring-type thread eyelet winding arrangement having a winding head moving axially to and fro over the rotating winding core may be used for winding. The fibre strands are guided in the ring-type thread eyelet in such a manner that they run onto the winding core in a widely spread manner and preferably with a flattening ratio, i.e. width b to thickness a of the fibre strand, greater than 25:1.

The individual windings are applied in such a way that the individual fibre strands 8 of a winding are wound at a distance c corresponding to a multiple of the strand width b. In the embodiment, the distance c which is provided is twice the fibre width, i.e. distance 2b. The latter corresponds to a centre distance of the fibre strands of the individual windings of 3b. The distance c may also be slightly greater than 2b so as to avoid overlapping of the fibre strands in windings of the same winding direction, as described below. As a result of the extreme and ordered spreading of the fibre strands which is possible during winding, a low thickness of the fibre layer in the flange region is achieved and results in the desired minimal flange thickness. At the same time, resin pockets are avoided.

In the embodiment of FIG. 1, six fibre strands 108 of identical winding direction are applied parallel to one another in a first pass. In the second pass, during the return pass of the winding head, a winding of opposite lead and again comprising six fibre strands 100 is applied. The first and second windings produce a lattice design having lattice openings 109 with the dimensions $\approx 2b \cdot 2b$.

During the third pass, a third winding comprising six fibre strands is applied in the same direction of winding as the first winding. The fibre strands 112 of said third winding are wound offset relative to the fibre strands of the first winding by the strand width b. There then remains between the strands 108 and 112 of the first and third windings a distance $c' = b$. This results in rectangular lattice openings 111 having the dimensions 2b·b.

During the fourth pass, the fourth winding comprising six parallel winding strands 114 is applied in the same direction of winding as the second winding 110 and is again offset relative to the fibre strands 110 of the second winding by the strand width b. The first and fourth windings therefore produce a lattice-like wound layer having lattice openings 113 with the dimensions $\approx b \cdot b$.

During the fifth pass, a further winding comprising six parallel fibre strands 115 is applied, again in the same direction of winding as the first and third windings and in such a manner that the fibre strands of said fifth winding are wound into the interspaces c left between the fibre strands 108, 112 of the first and third windings during the third pass. The lattice openings 113 remaining after the fourth winding are covered by said fifth winding.

Finally, during the sixth pass, the sixth winding, whose winding strands have the same lead as the winding strands of the second and fourth windings, is applied. The winding strands of the sixth winding are wound into the interspaces c'' between the winding strands 110, 112 of the second and fourth windings.

For clarification, the six passes are illustrated in FIG. 20 offset in an axial direction. They all begin, however, at the same point in an axial direction of the workpiece. The second, fourth and sixth passes are in each case opposed in an axial direction to the first, third and fifth passes.

In a winding manufactured in the described manner, with a total of six windings a quasi-braided structure is produced in which only two fibre strands overlap at defined crossing points and only slight undulation occurs. This leads to a high percentage of rigidity and strength relative to a completely stretched fibre. Suitably pre-tensioning the fibre strands during winding achieves the effect that the underlying fibre strands which are crossed are pressed against the winding core.

A closed wound structure is achieved with each six passes. Further closed wound structures may be applied on top in the same manner. The winding head may be controlled in such a way that a closed lattice structure is applied with four, eight or even more passes.

The fibre strands are conveyed from the end of the cylindrical portion in the manner described above over the spreader disks of the winding core, with wide spreading of the fibre strands and the low number of fibre strand layers at the crossing points also being maintained in the conical region. By said means, a very low thickness of the fibre layers in the flange region is achieved, with said thickness in addition, as indicated above, continuously reducing towards the outer periphery of the flange.

The flow of fibres in the widened state, i.e. in the finished flange, may be influenced in the embodiments of FIGS. 10 to 15 and 16 to 18 by, instead of constructing the cores in their conical region, in which the fibres are adjacent to the core, with a conical surface, as shown in the drawings, making said generated surfaces convex, resulting in a curved deposit of the fibres over the bulged cone region which in turn influences the flow of fibres in the widened region to the extent that, after widening of the conical winding region, a less curved flow is imparted to the fibres.

What is claimed is:

1. A method for manufacturing a fiber reinforced composite structural member, said structural member including a tubular portion having predetermined inner and outer configurations and having opposite ends, and a pair of planar flanges extending radially outwardly from said tubular portion at said opposite ends, said method comprising:
   a. applying a winding to a core assembly, said core assembly comprising a core element having an axis and including a central portion having opposite ends, said central portion having a configuration which is substantially complimentary to said inner configuration of said tubular portion, said core assembly further comprising a pair of spreader elements which extend outwardly from said core element adjacent said opposite ends of said central portion thereof, said winding comprising a plurality of fiber strands in an uncured curable matrix, said fibers crossing one another in angular relation to said axis, said winding being applied to both said central portion and said spreader elements and being conically widened outwardly by said spreader elements to provide conical regions in said winding adjacent opposite ends of said central portion;
   b. applying a forming tool to the portion of said winding on said central portion, said forming tool having a tubular inner surface which is substantially complimentary to said tubular portion outer configuration, said tubular inner surface terminating in opposite ends, said forming tool also including a pair of planar end faces which extend radially outwardly relative to said tubular inner surface, said tubular inner surface merging into said end faces through rounded transition edges;
   c. applying outward pressure to said fibers along said transition edges utilizing an elastically expandable pressure medium in order to retain said fibers in uniformly distributed orientation along said transition edges;
   d. thereafter assembling the fibers and matrix in said conical regions to form flange composites which are applied to said end faces, said fibers being uniformly distributed in said flange composites; and
   e. curing said matrix.

2. In the method of claim 1, said flange composites each including first and second fiber reinforcing layers on opposite sides of the uniformly distributed fibers thereof.

3. In the method of claim 2, said flange composites being formed by applying said first fiber reinforcing layers to said end faces, applying said uniformly distributed fibers and said matrix to said first fiber reinforcing layers, and then applying said second fiber reinforcing layers to said uniformly distributed fibers and said matrix.

4. In the method of claim 2, said step of forming said flange composites comprising spraying first reinforcing fiber layers onto said end faces, applying said uniformly distributed fibers and said matrix to said first fiber reinforcing layers, and spraying second fiber reinforcing layers onto said uniformly distributed fibers and said matrix.

5. In the method of claim 1, said core element comprising a carrier and an elastomeric inflatable tube on said carrier.

6. The method of claim 5, further comprising applying a support tool to said core element over said inflatable tube, said support tool including a bell-shaped portion having an inner diameter and opening in the direction of said forming tool through an open end, said support tool being displaceable along said axis and further including a flange-like portion on said open end, said inner surface of said forming tool having an inner diameter, said rounded transition edges having a radius, said flange-like portion having an inner diameter which is larger than the inner diameter of said inner surface of said forming tool plus twice the radius of said transition edges but smaller than the inner diameter of said bell-shaped portion.

7. In the method of claim 1, said core element comprising a core carrier and a thin-walled resilient element on said core carrier, said resilient element including a central tubular portion having opposite ends and a conical portion at each end of said central tubular portion, each of said conical portions terminating in a free end, a fixed annular element on the core carrier at the free end of each of said conical portions, each of said fixed annular elements having an outer periphery having annular groove therein, the free end of each of said conical portions being received and secured in the annular groove in the adjacent annular element, said annular elements further including opposite inwardly facing surfaces, said spreader elements comprising spreader discs which are disposed axially inwardly from said opposed inwardly facing surfaces and axially displaceable toward said forming tool, said core carrier and said conical portions cooperating to partially define a confined area, said confined area being connectible to a compressed air source, said forming tool end faces having outer circumferential peripheries, said method further comprising applying a pair of support tools to said core element after applying said forming tool to said winding, said support tools being operative in cooperation with said forming tool for defining enclosed areas between said conical portions and the outer circumferential peripheries of said forming tool end faces.

8. In the method of claim 7, said support tools being of bell-shaped configuration and being axially displaceable on said core carrier.

9. In the method of claim 1, said core element comprising a core carrier and an axially displaceable resilient winding core on said core carrier, said winding core including two conical portions and two shoulder portions on said conical portions, said shoulder portions extending over at least part of said central portion of said core element, each of said conical portions having a remote end which is remote from the shoulder portion thereof, said core assembly further comprising a pair of support elements on said core element, said support elements being axially displaceable inwardly and together from positions adjacent the remote ends of said conical portions toward said forming tool once said forming tool has been applied to said winding in order to apply said fibers and said matrix in said conical regions to said end faces, and locking means for locking said support elements in position after applying said matrix and said fibers in said conical regions to said end faces of said forming tool.

10. In the method of claim 9, said locking means comprising wheels on said core carrier.

* * * * *